United States Patent [19]

Wilke et al.

[11] 3,912,786

[45] Oct. 14, 1975

[54] PROCESS FOR PRODUCING BICYCLO-[3,3,0]-OCTENE-(2)

[75] Inventors: Günther Wilke; Borislav Bogdanovic, both of Mulheim (Ruhr); Hans-Georg Nüssel, Hamburg, all of Germany

[73] Assignee: Studiengesellschaft Kohle mbH, Mulheim (Ruhr), Germany

[22] Filed: Feb. 22, 1974

[21] Appl. No.: 444,949

Related U.S. Application Data

[63] Continuation of Ser. No. 210,252, Dec. 20, 1971, abandoned.

[30] Foreign Application Priority Data

Dec. 22, 1970 Germany............................ 2063149

[52] U.S. Cl........................ 260/666 PY; 260/666 A
[51] Int. Cl.².......................................... C07C 13/00

[58] Field of Search.................... 260/666 PY, 666 A

[56] References Cited
UNITED STATES PATENTS

3,471,581  10/1969  Maxfield...................... 260/666 PY

*Primary Examiner*—Veronica O'Keefe
*Attorney, Agent, or Firm*—Burgess, Dinklage & Sprung

[57] ABSTRACT

Bicyclo-[3,3,0]-octene-(2) is prepared with quantitative conversion and in high yields at substantially room temperature and high reaction rate with the use of a catalytic mixture of nickel compounds and aluminum compounds. The resulting bicyclooctene is a valuable monomer for the production of a high molecular weight polyolefin or a starting material for alicyclic dicarboxylic acids.

13 Claims, No Drawings

PROCESS FOR PRODUCING BICYCLO-[3,3,0]-OCTENE-(2)

This application is a continuation of Ser. No. 210,252 filed Dec. 20, 1971 and now abandoned.

This invention relates to a process for the production of bicyclooctene.

A bicyclooctene has been described for the first time by A. C. Cope and P. E. Peterson (J.Am.Soc., 81, 1643 (1959)). The isomerization of cyclooctadiene-(1,5) to form cis-bicyclo-[3,3,0]-octene-(2) with the use of a strongly basic catalyst such as potassium phenyl at high temperatures in excess of 150°C. and for extended reaction times of more than 20 hours has been disclosed by P. R. Stapp and R. F. Kleinschmidt (J.Org.Chem., 30, 3006 (1965) and U.S. Pat. No. 3,363,016). The conversion rate and yield are moderate. Potassium hydride also has an isomerizing action on cyclooctadiene-(1,5) at 190°C. (L. H. Slaugh, J.Org.Chem., 32, 108 (1966)).

German Patent 1,240,852 discloses a process for isomerizing cyclooctadiene-(1,5) to form bicyclo-[0,3,3]-octene-(2) with the use of a catalyst comprising a nickel(0) compound and a homeopolar halogen compound. In the preferred temperature range of 100° to 200°C., the maximum conversion of cyclooctadiene is about one third, which means that a maximum yield of about 70% based on this conversion is achievable.

A process which is satisfactory from the economical point of view has not been available up to the present.

It has now been found surprisingly that cyclooctadiene-(1,5) can be isomerized to form the desired bicyclooctene with a quantitative conversion and high yields at substantially room temperature and substantially instantaneously, i.e., with a high reaction rate, by using a catalytic mixture comprising nickel compounds and aluminum compounds. The catalytic reaction is exothermal and the heat of reaction is desirably removed by means of the heat of evaporation of the solvent used. Suitable solvents are polar halogenated hydrocarbons such as methylene chloride or chlorobenzene. However, the reaction also proceeds in the manner desired in the absence of a solvent.

Suitable nickel compounds include either soluble nickel salts such as nickel acetate, nickel alcoholates, nickel phenates, nickel salts or organic acids, nickel acetyl acetonate, but also the more sparingly soluble nickel halides, or organonickel compounds (i.e., compounds having one or more Ni-C linkages) such as $\pi$-allyl nickel acetyl acetonate, cyclooctenyl nickel acetyl acetonate, $\pi$-allyl nickel chloride, $\pi$-allyl nickel bromide, or generally $\pi$-allyl nickel-X compounds wherein X may be the anion of the nickel salts mentioned above or bis($\pi$-allyl)-nickel compounds.

Suitable aluminum compounds include aluminum halides and halogen-containing organoaluminum compounds such as alkyl aluminum dihalides, alkyl aluminum sesquihalides, and dialkyl aluminum halides and corresponding aryl compounds. When using nickel salts, it is necessary while preparing the catalyst to use the halogen-containing organoaluminum compounds mentioned above. In case of the organonickel compounds, combinations with aluminum halides and also with organoaluminum compounds may be used.

Only a small amount of the catalyst needs be used. The molar ratio of nickel/cyclooctadiene-(1,5) should range between 1:50 and 1:2,000 and preferably between 1:500 and 1:1,000. The reaction temperature may range between −20° and 150°C. and preferably between 0° and 150°C., e.g. between 0° and +40°C. The molar ratio of the catalyst components should range between 2 Al : 1 Ni and 10 Al : 1 Ni. A molar ratio of 2Al : 1Ni to 4Al : 1Ni is to be considered as the most efficient range within the scope of this invention. Operation under pressure is unnecessary because the operating temperature is lower than the boiling point of cyclooctadiene or of the solvent used. The reaction may be carried out batchwise or continuously.

The bicyclooctene which is obtainable extremely readily and conveniently by the new process is a valuable monomer for the production of a high molecular weight polyolefin or a starting material for the production of alicyclic dicarboxylic acids.

General procedure for Examples 1 to 5

In a three-necked flask equipped with a stirrer, dropping funnel, reflux condenser and internal thermometer, cyclooctadiene-(1,5) is dissolved with a Lewis acid in a solvent, e.g., methylene chloride, in a ratio of 2 parts by volume of methylene chloride to 1 part by volume of cyclooctadiene. A solution of the nickel compound mentioned hereafter in methylene chloride is added dropwise to the mixture which is maintained at about 0°C. by cooling. The reaction mixture turns red; the temperature rises to the boiling point of the solvent, and the isomerization reaction is completed after a few minutes. The catalyst is destroyed by introducing, for example, gaseous ammonia. Further suitable agents for decomposing the catalyst include aqueous ammonia, alcohol and amines. After filtration of the reaction mixture, the solvent is removed by distillation.

Example 1

(a)  46.8 g. of COD-(1,5)
2.16 g. of Ni($C_5H_7O_2$)$_2$
4.16 g. of ethyl aluminum sesquichloride
solvent: $CH_2Cl_2$
temperature: 0°C.
conversion: 99.8%
yield: 98.9% of bicyclooctene (b)  1275 g. of COD-(1,5)
15.4 g. of Ni($C_5H_7O_2$)$_2$
29.8 g. of ethyl aluminum sesquichloride
solvent: $CH_2Cl_2$
temperature: 0°C. (increase to +40°C. during the reaction)
conversion: 99.8%
yield: 94.2% of bicyclooctene (c)  1000 g. of COD-(1,5)
2.64 g. of Ni($C_5H_7O_2$)$_2$
10.6 g. of ethyl aluminum sesquichloride
solvent: $CH_2Cl_2$
temperature: +5°C.
conversion: 99.8%
yield: 92.5% of bicyclooctene

Example 2

23.0 g. of COD-(1.5)
0.86 g. of ($\pi$-$C_3H_5$)Ni($C_5H_7O_2$)
2.1 g. of ethyl aluminum sesquichloride
solvent: $CH_2Cl_2$
temperature: 0°C.
conversion: 97.0%
yield: 90.0% of bicyclooctene

Example 3

10.8 g. of COD
1.75 g. of [($\pi$-$C_3H_5$)NiBr]$_2$
1.9 g. of ethyl aluminum sesquibromide
solvent: $CH_2Cl_2$
temperature: 0°C.
conversion: 58.0%
yield: 79.0% of bicyclooctene

Example 4

10.8 g. of COD-(1.5)
1.75 g. of [($\pi$-$C_3H_5$)NiBr]$_2$
2.67 g. of $AlBr_3$

-Continued

```
            solvent: CH₂Cl₂
        temperature: 0°C.
         conversion: 89%
              yield: 86% of bicyclooctene
                 Example 5
     59.5  g. of COD-(1,5)
     2.82  g. of Ni(C₅H₇O₂)₂
     5.45  g. of ethyl aluminum sesquichloride
            solvent: C₆H₅Cl
        temperature: 0°C.
         conversion: 99.7%
              yield: 96.6%
```

General procedure for Examples 6 and 7

Ni(acac)₂ is suspended in COD-(1,5). Undiluted ethyl aluminum sesquichloride is added dropwise to the vigorously stirred mixture. The color turns to red and the mixture becomes warm. Elemental nickel is precipiated towards the end of the reaction. The mixture is allowed to cool whereupon the catalysis is discontinued by introducing gaseous ammonia. The bicyclooctene is isolated by recondensation under vacuum.

```
                 Example 6
     1.02  g. (3.9 mmoles) of Ni(C₅H₇O₂)₂
     21.0  g. (195 mmoles) of COD-(1,5)
     1.94  g. (15.6 mmoles) of ethyl aluminum sesquichloride
         conversion: 99.7%
              yield: 90.0% of bicyclooctene
                 Example 7
     1.02  g. (3.9 mmoles) of Ni(C₅H₇O₂)₂
     63.0  g. (585 mmoles) of COD-(1,5)
     1.94  g. (15.6 mmoles) of ethyl aluminum sesquichloride
         conversion: 51.6%
              yield: 90.5% of bicyclooctene
                 Example 8
     574.8 mg. (4.4 mmoles) of NiCl₂
     1.06  g. (8.85 mmoles) of (C₂H₅)₂AlCl
     48.2  g. (444 mmoles) of COD-(1,5)
```

Nickel dichloride, diethyl aluminum monochloride and cyclooctadiene-(1,5) were refluxed together with 114 ml. of chlorobenzene (133°C.). After a reaction time of 3 hours, a sample was taken. It contained 77% of a $C_8$ fraction (based on cyclooctadiene charged) having the following composition:

```
            93.9% of bicyclooctene
             1.6% of COD-(1,3)
             0.8% of COD-(1,4)
             0.4% of COD-(1,5)
```

The residue in an amount of 23%, based on COD charged, consists of polymers.

What is claimed is:

1. Process for producing bicyclo-[3,3,0]-octene-(2) from cyclooctadiene-(1,5), which comprises using a catalyst consisting essentially of (a) a nickel material with (b) a halogen-containing aluminum material wherein said nickel material is an organonickel compound selected from nickel salts of organic acids, nickel halides, nickel alcoholate, nickel phenate, nickel acetyl acetonate, $\pi$-allyl nickel acetyl acetonate, bis ($\pi$-allyl)-nickel and cyclooctenyl nickel acetyl acetonate.

2. Process as claimed in claim 1 wherein said aluminum material is a halogen-containing organoaluminum compound.

3. Process as claimed in claim 1 wherein said aluminum material is an aluminum halide.

4. Process as claimed in claim 1 wherein said nickel material is nickel acetate and said aluminum material is an aluminum halide.

5. Process as claimed in claim 1 wherein said nickel material is nickel acetyl acetonate and said aluminum material is a halogen containing organoaluminum compound.

6. Process as claimed in claim 1 wherein said bicyclo-[3,3,0]-octene-(2) is produced in a yield of at least about 80% based on starting cyclooctadiene-(1,5).

7. Process as claimed in claim 1 wherein said aluminum material is an alkyl aluminum dihalide, sesquihalide or dialkylaluminum halide.

8. Process as claimed in claim 1 wherein the molar ratio of said aluminum material to said nickel material is such that at least two moles of aluminum and up to ten moles of aluminum are provided for every mole of nickel.

9. Process as claimed in claim 1 wherein the mole ratio of said nickel material to the cyclooctadiene-(1,5) starting material is from 1:50 to 1:2,000.

10. Process as claimed in claim 1 wherein said nickel material is nickel acetyl acetonate and said aluminum material is ethyl aluminum sesquichloride.

11. Process as claimed in claim 1 wherein said nickel compound is a $\pi$-allyl nickel halide and said aluminum material is ethyl aluminum sesquichloride or aluminum halide or diethyl aluminum chloride.

12. Process as claimed in claim 1 carried out in the substantial absence of any solvent other than cyclooctadiene(1,5) and bicyclo-[3,3,0]-octene-(2).

13. Process as claimed in claim 1 wherein said nickel halide is $\pi$-allyl nickel chloride or $\pi$-allyl nickel bromide.

* * * * *